United States Patent [19]
Buschbom et al.

[11] Patent Number: 4,772,173
[45] Date of Patent: Sep. 20, 1988

[54] SILO UNLOADER

[75] Inventors: Floyd E. Buschbom, Long Lake; Glen D. Hansen, Maple Plain, both of Minn.

[73] Assignee: Van Dale, Inc., Long Lake, Minn.

[21] Appl. No.: 834,948

[22] Filed: Feb. 28, 1986

[51] Int. Cl.$^4$ ............................................. B65G 65/46
[52] U.S. Cl. .................................... 414/320; 414/310
[58] Field of Search ............... 414/305, 309, 310, 311, 414/312, 313, 314, 318, 319, 320, 321, 326

[56] References Cited

U.S. PATENT DOCUMENTS

| | | |
|---|---|---|
| 2,518,601 | 8/1950 | Cordis . |
| 2,651,438 | 9/1953 | Peterson . |
| 2,719,058 | 9/1955 | Van Dusen . |
| 2,794,560 | 6/1957 | Buschbom . |
| 2,877,907 | 3/1959 | Buschbom . |
| 2,995,260 | 8/1961 | McCann et al. . |
| 3,050,201 | 8/1962 | Humphrey ............................ 414/310 |
| 3,063,581 | 11/1962 | Bruecker ............................. 414/318 |
| 3,075,658 | 1/1963 | Neighbour ........................... 414/314 |
| 3,139,995 | 7/1964 | Buschbom . |
| 3,181,715 | 5/1965 | Olson . |
| 3,204,786 | 9/1965 | Kucera . |
| 3,207,332 | 9/1965 | Buschbom . |
| 3,221,904 | 12/1965 | Buschbom . |
| 3,223,256 | 12/1965 | Buschbom . |
| 3,229,828 | 1/1966 | Kucera . |
| 3,232,456 | 2/1966 | Buschbom ........................... 414/320 |
| 3,239,279 | 3/1966 | Skromme et al. ................. 414/318 X |
| 3,272,355 | 9/1966 | Loesch et al. ....................... 414/319 |
| 3,363,785 | 1/1968 | Kucera . |
| 3,391,807 | 7/1968 | Buschbom ........................... 414/319 |
| 3,822,796 | 7/1974 | Buschbom . |
| 3,912,090 | 10/1975 | Pondell . |
| 4,170,385 | 10/1979 | Buschbom et al. . |
| 4,242,026 | 12/1980 | Vaughan et al. ................. 414/305 X |
| 4,242,028 | 12/1980 | Van Dusen ........................... 414/320 |
| 4,585,385 | 4/1986 | Buschbom et al. ................. 414/311 |

FOREIGN PATENT DOCUMENTS

| | | | |
|---|---|---|---|
| 2132524 | 2/1972 | Fed. Rep. of Germany ...... 414/326 |
| 2914926 | 10/1979 | Fed. Rep. of Germany ...... 414/310 |
| 1384426 | 2/1975 | United Kingdom ............... 414/319 |

Primary Examiner—Kenneth J. Dorner
Assistant Examiner—Thomas A. Rendos
Attorney, Agent, or Firm—Burd, Bartz & Gutenkauf

[57] ABSTRACT

A silo unloader has an auger collector for moving material to an impeller operable to discharge material from a tower silo. A sprocket and endless chain secured to a transition assembly mounted on the impeller drives the collector around the silo wall. Wheels on the outer end of the collector and wheels on a biased arm on the inner end of the frame stabilize the unloader in the silo. A stop pivotally connected to the collector limits its backward movement by lifting the collector from the material.

49 Claims, 4 Drawing Sheets

U.S. Patent  Sep. 20, 1988  Sheet 1 of 4  4,772,173
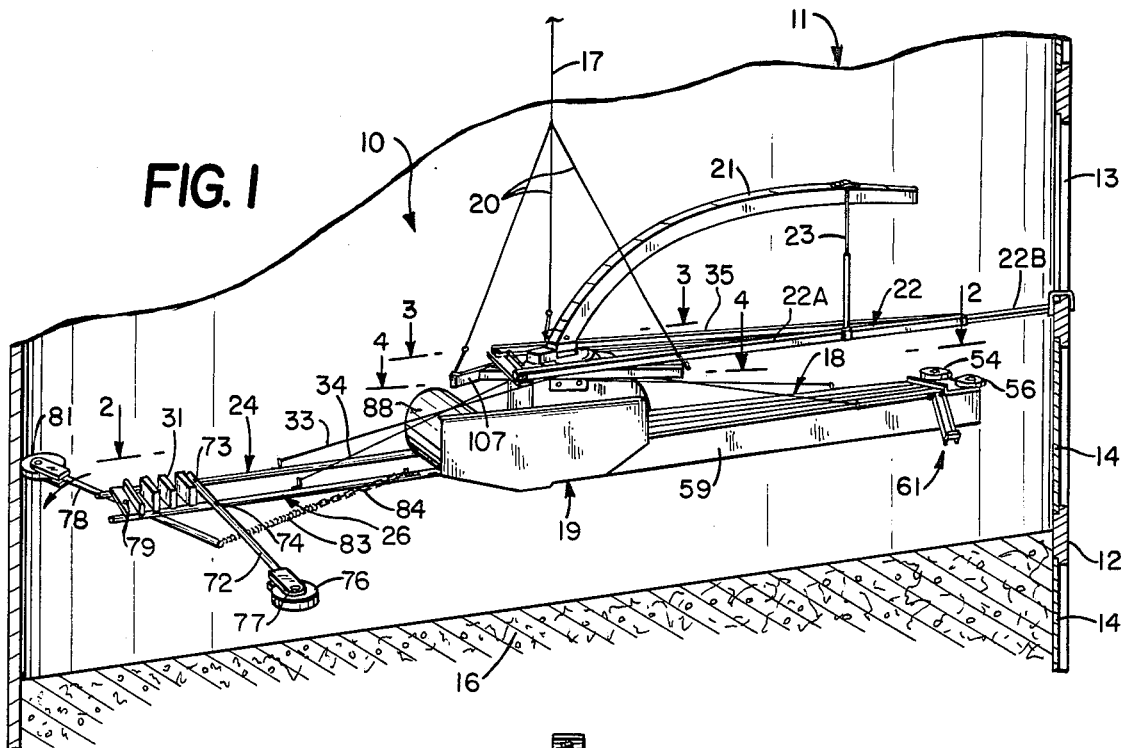
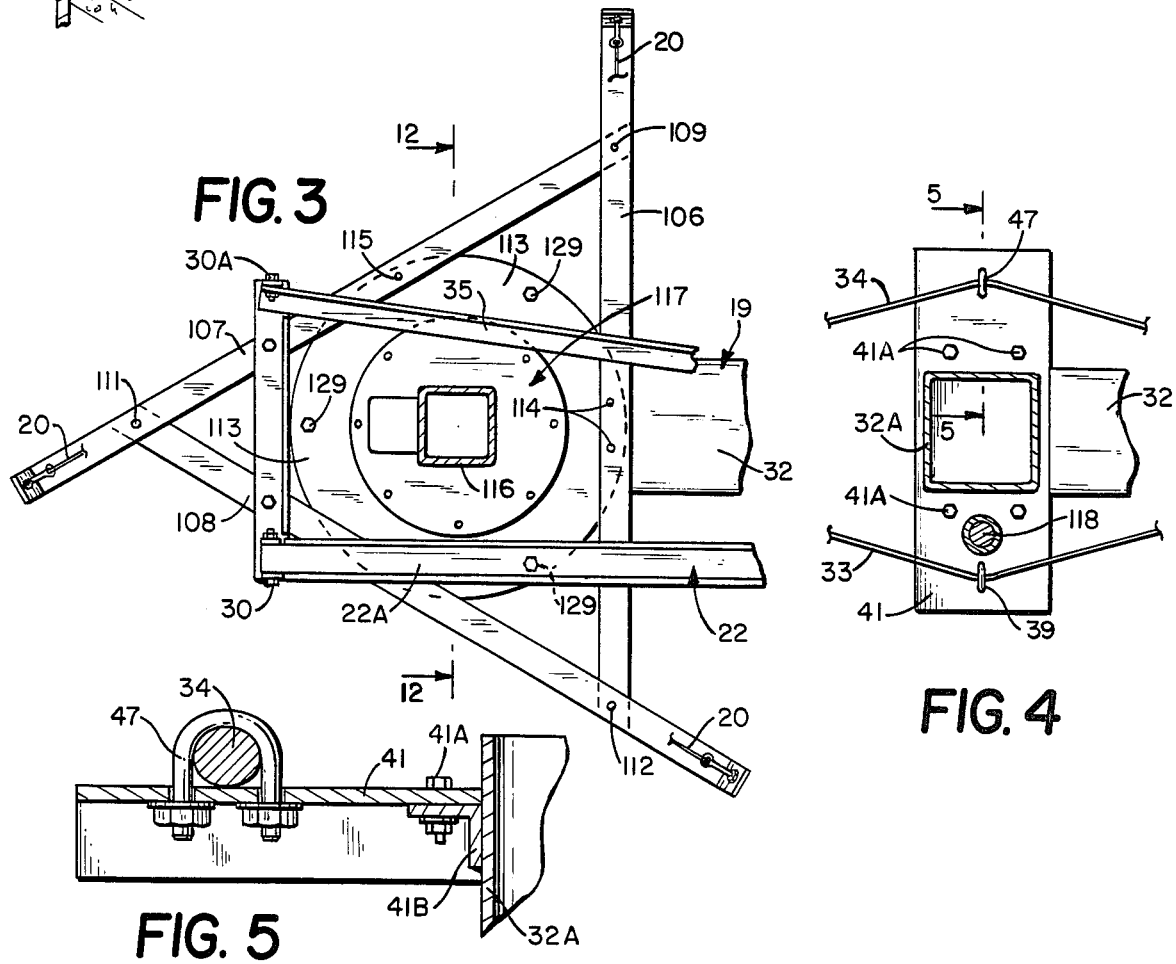

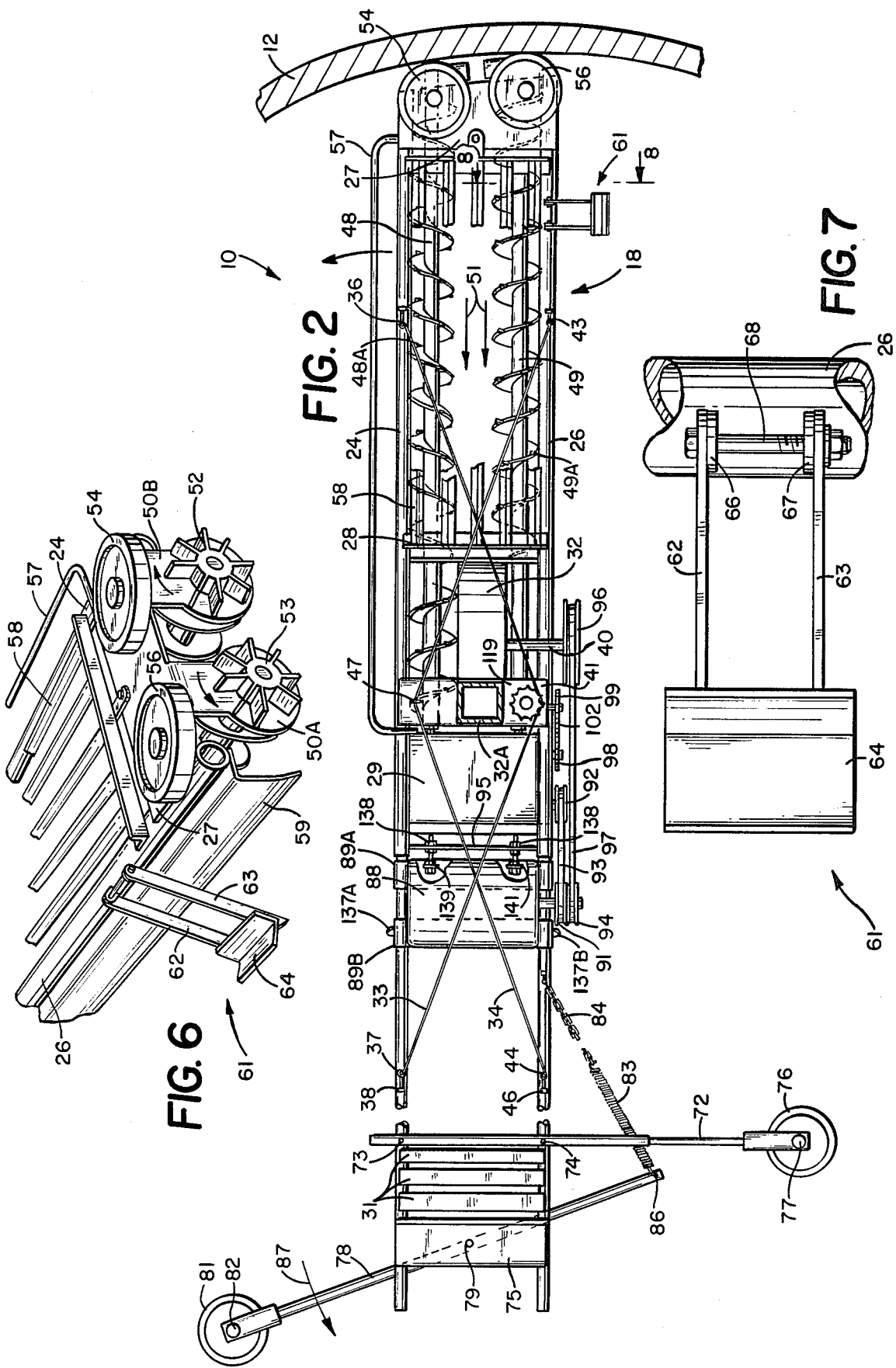

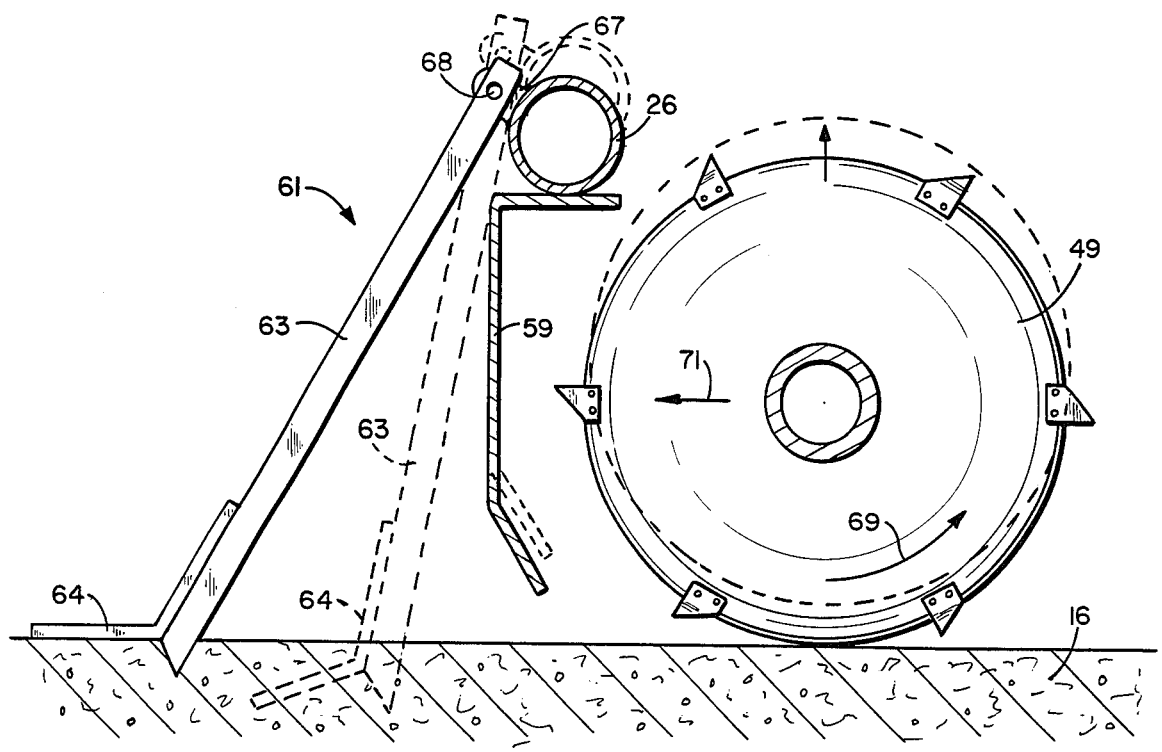
FIG. 8
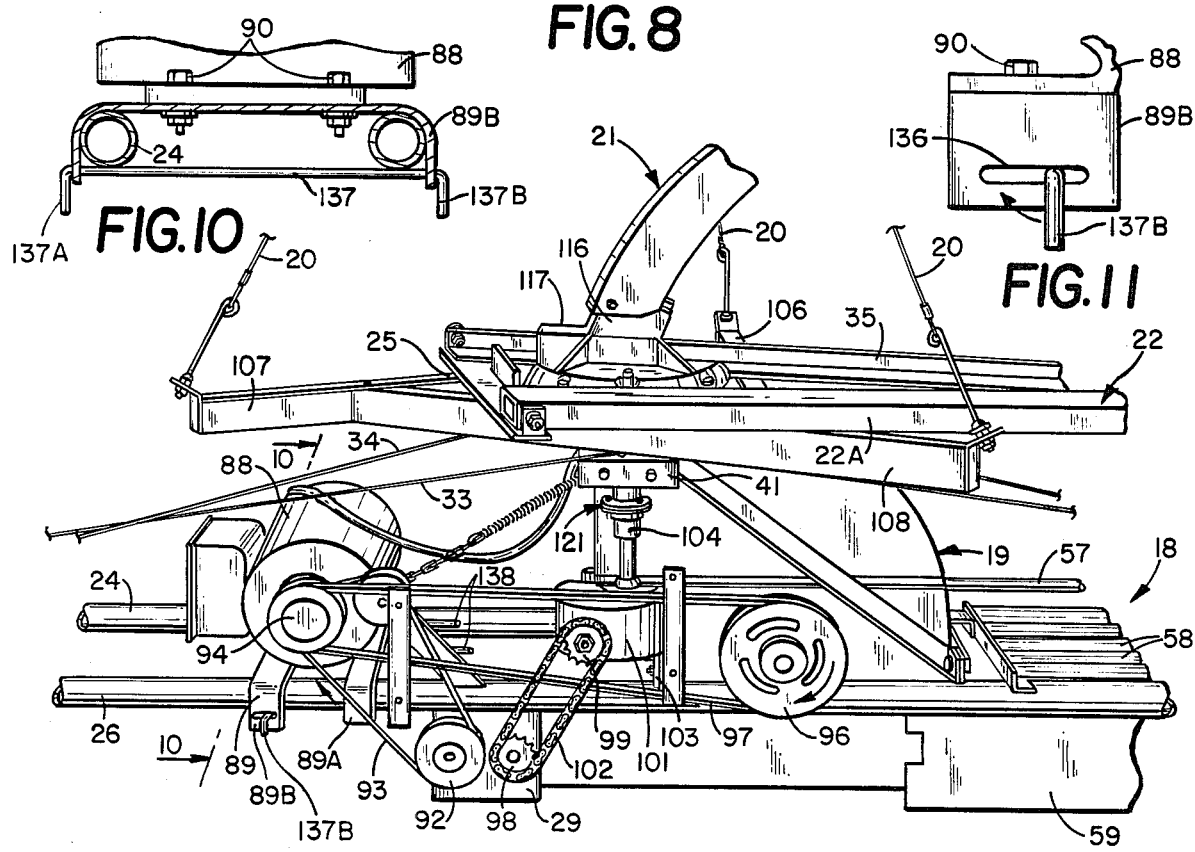
FIG. 10
FIG. 11
FIG. 9

SILO UNLOADER

FIELD OF INVENTION

The invention is in the field of machines for removing material from a storage area and transporting the material to a select location. The machine is a top unloading silo unloader used to remove silage from a tower silo into a chute extended to the base of the silo.

BACKGROUND OF INVENTION

Top unloading silo unloaders are used in tower silos to remove material stored in the silo. These unloaders have collectors that are driven around the silo walls to gather material and move it to impeller assemblies which eject the material from the silos. Drive structures, such as surface engaging wheels and hubs, and ring and gear drives, are used to continuously move the collectors around the silo walls. Examples of silo unloader collector drives are shown in the following U.S. patents. Buschbom in U.S. Pat. No. 3,139,995 discloses a drive hub operable to move a top unloading silo unloader around a tower silo. The hub located laterally of the auger collectors and impeller is adjustable to provide a selected amount of pressure on the silo unloader wall engaging wheels. Kucera in U.S. Pat. No. 3,229,828 shows a silo unloader having a power transmission that produces a torque when operated which causes the collector to move around the silo. The power transmission has a drive gear off-set from the upright axis of rotation of the unloader engageable with a driven gear so as to rotate the collector chain and move the collector around the silo. Buschbom et al in U.S. Pat. No. 4,170,385 discloses a silo unloader having driven wheels adjacent opposite sides of the collector. The wheels being driven on the surface of the material disturb the material and reduce the efficiency of the collector.

Top unloading silo unloaders are used with different types of materials that are stored in the silo, such as silage, haylage and the like. These materials have varying degrees of compactness within the silo. Some of the material is loose while others is extremely hard, such as frozen silage. The auger collectors of the silo unloaders, when operating with frozen or very compact material, tend to bounce thereby reduce smooth and efficient operation of the silo unloader.

SUMMARY OF INVENTION

The invention is directed to a silo unloader pendently supported within a tower silo for removing the material stored in the silo. The silo unloader has a collector with augers operable to move material to an impeller assembly. A rotatable impeller located within the impeller assembly picks up the material from the collector and discharges it into a discharge chute aligned with an open doorway in the silo wall. A drive mechanism located below an electrical transition assembly operates to smoothly and effectively move the collector around the silo. The torque generated by the drive mechanism is positive and centralized to efficiently operate the silo unloader in all types of materials including hard and frozen material in the silo. Separate drive wheels located in driving engagement with the material stored in the silo are not used to move the collector around the silo. The silo unloader is equipped with spring loaded pressure wheel means to keep the silo unloader under tension within the silo. This reduces the bouncing of the silo unloader when operated to remove frozen and hard compact material. The result is smoother operation, higher volume, cleaner silo walls, and longer silo unloader life. The collector is equipped with a reverse stop that prevents the backward movement of the collector in the event that the power to drive the collector is interrupted.

The preferred embodiment of the silo unloader has an elongated frame that is locatable in a generally horizontal position within a silo. Auger means located generally parallel to the frame are independently driven to move the material stored in the silo toward the center area of the silo. A material transfer means comprising an impeller assembly mounted on the frame adjacent the inner end of the auger means receives the material from the auger means and discharges the material through an open doorway in the silo. The impeller assembly has a housing with a first opening to receive material from the auger means and a second opening for discharging the material from the housing. A rotatable impeller located within the housing moves the material through the housing. An electrical transition assembly located adjacent the top of the impeller assembly has a rotatable first portion secured to the housing and a non-rotatable second portion pendently supported in the silo. A torque arm assembly is connected to the non-rotatable portion rearwardly of the impeller assembly and to the silo wall to prevent the rotation thereof. The torque arm assembly has arm members that longitudinally move relative to each other to allow the silo unloader to move down into the silo as material is removed from the silo. A plate secured to the housing is located below the transition assembly. The rigidity of the frame is reinforced with cables secured to the plate and opposite ends of the frame. The cables also reduce the torque on the housing established by a drive for turning or revolving the frame and auger means around the silo.

The drive includes a power transmission secured to the frame having a driven shaft rotatably mounted on the plate. A sprocket mounted on the shaft engages an endless roller link chain. The chain is secured to the non-rotatable portion of the transition assembly so that rotation of the sprocket causes the sprocket to move about the roller link chain thereby turning the frame and silo unloader about the silo. The chain and sprocket are located in close relation to the bottom of the transition assembly without substantially increasing the physical size of the silo unloader. This allows the silo unloader to be raised higher into the tripod at the top of the silo than a conventional ring drive silo unloader. The filling of the top of the silo is facilitated when the silo unloader is closely adjacent to the top of the tripod.

A stop pivotally mounted on an outer end portion of the frame limits reverse or backward movement of the silo unloader in the event that the drive is interrupted or fails. The stop has an arm that raises the auger means away from the material in response to background movement of the silo unloader thereby reducing the reverse drive force of the auger means.

Wall engaging wheels mounted on the outer end of the frame cooperate with second wheel means mounted on the inner end of the frame for engagement with the wall to position the silo unloader in the silo. The second wheel means includes a wheel that is biased into engagement with the wall to maintain the silo unloader under tension within the silo thereby reduce bouncing when operated to remove frozen and hard compact material and enabling the wall cleaners to remove substantially all material from the wall of the silo.

DESCRIPTION OF DRAWING

FIG. 1 is a perspective view of the silo unloader of the invention pendently supported in a tower silo;

FIG. 2 is an enlarged sectional view taken along the line 2—2 of FIG. 1;

FIG. 3 is an enlarged sectional view taken along the line 3—3 of FIG. 1;

FIG. 4 is an enlarged sectional view taken along the line 4—4 of FIG. 1;

FIG. 5 is an enlarged sectional view taken along the line 5—5 of FIG. 4;

FIG. 6 is a perspective view of the outer end of the collector of the silo unloader of FIG. 1;

FIG. 7 is an enlarged plan view of a backstop pivotally mounted to the collector frame member;

FIG. 8 is an enlarged sectional view taken along the line 8—8 of FIG. 2;

FIG. 9 is an enlarged side view of the drive system and impeller of the silo unloader of FIG. 1;

FIG. 10 is an enlarged sectional view taken along line 10—10 of FIG. 9;

FIG. 11 is an end view of FIG. 10;

DESCRIPTION OF PREFERRED EMBODIMENT

Figure 12:
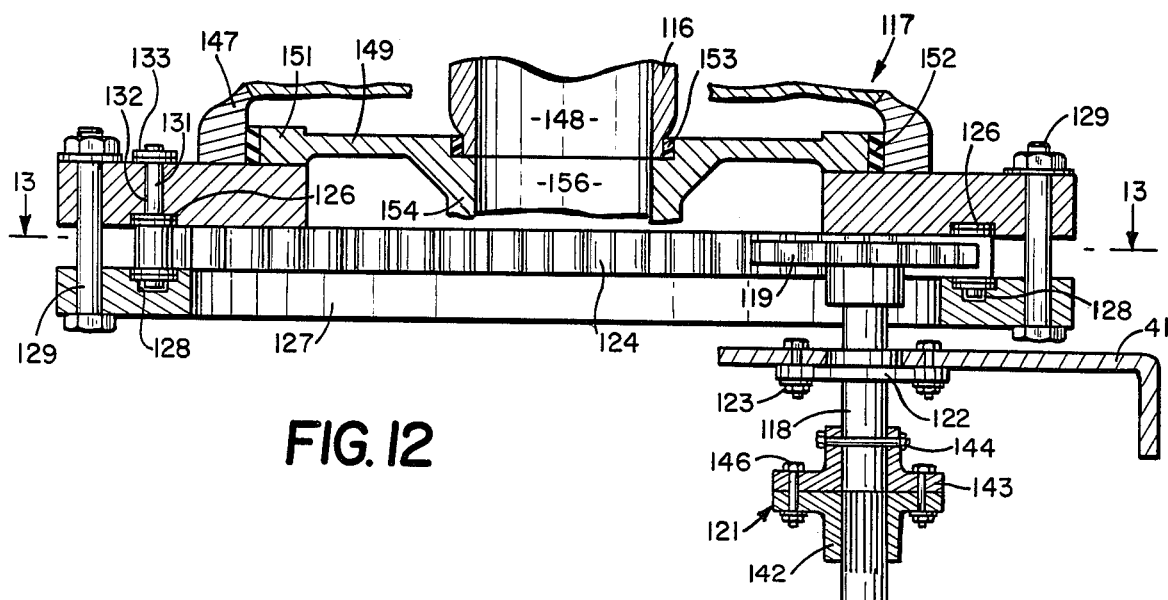
FIG. 12 is a fragmentary sectional view taken along the line 12—12 of FIG. 3.

Referring to FIG. 1, there is shown a silo unloader indicated generally at 10 pendently supported inside a tower silo 11. Tower silo 11 has an upright generally cylindrical side wall 12 provided with a plurality of vertically spaced doorways 13. Doors 14 are used to close doorways 13 to retain bulk material 16, such as silage and haylage, within the silo. A cable 17 extended upwardly to a tripod (not shown) or other support structure on top of the silo wall pendently supports silo unloader 10 within silo 11 on top of bulk material 16. As shown in FIGS. 1 and 3, a plurality of cables 20 connect the lower end of cable 17 to arms 106, 107, and 108. The arms 106, 107, and 108 form a triangular support connected to a non-rotatable ring 113. The structure of the arms 106, 107, and 108 and ring 113 are hereinafter described. A tripod and a silo unloader supporting cable connected to a winch is shown in U.S. Pat. No. 2,995,260.

Silo unloader 10 has an elongated collector indicated generally at 18 extended outwardly from a material transfer assembly shown as an impeller assembly 19. Collector 18 gathers material and moves the material to the center area of the silo and into impeller assembly 19. A convex curved discharge chute 21 mounted on top of impeller assembly 19 directs the material discharge from impeller assembly 19 through an open doorway 13 into an upright passageway adjacent the outside of the silo. A torque arm indicated generally at 22 maintains chute 21 in alignment with doorway 13. Torque arm 22 has first member 22A pivoted to a cross bar 25 with a pivot member 30. Cross bar 25 is connected to arms 107 and 108 rearwardly of impeller assembly 19. A brace 35 is connected to bar 25 and the inner end of member 22A. A second member 22B slidably telescoped on member 22A is hooked onto silo wall 12. Members 22A and 22B move relative to each other to extend the torque arm 22 to allow silo unloader 10 to move down in the silo as material 16 is removed from the silo. Torque arm 22 being pivoted with pivot member 30 rearwardly of impeller assembly 19 allows the silo unloader 10 to be lowered a considerable distance in the silo without repositioning the torque arm 22 on the silo wall. An upright support or rod 23 connected to torque arm 22 and chute 21 holds the chute above torque arm 22.

Silo unloader 10 has a pair of elongated parallel frame members 24 and 26 connected together with a end plate 27, cross member 28, gear box 29 and a holder for counterweights 31. Impeller assembly 19 has a housing 32 with an outlet end 32A located adjacent gear box 29 and connected to cross member 28. Impeller assembly 19 has a shaft 40 rotatably mounted on housing 32. An impeller having paddles (not shown) located within housing 32 is mounted on shaft 40. An example of impeller assembly 19 is disclosed by Buschbom in U.S. Pat. No. 3,221,904. As shown in FIGS. 4 and 5, a channel member or plate 41 is secured with bolts 41A to the top of housing 32. A angle member 41B secured to side of housing 32 accommodates bolts 41A. Plate 41 extends outwardly from the opposite sides of housing 32.

Referring to FIG. 2, a pair of double crossed cables 33 and 34 reinforce and minimize the shifting and warping of frame members 24 and 26. A hook 36 attaches the outer end of cable 33 to a outer section of frame member 24. The opposite end of cable 33 is joined to an eye 37 attached to a bracket 38. Bracket 38 is secured to the top of frame member 24. Cable 34 is attached to a hook 43 as mounted on the outer end of frame member 26. The inner end of cable 34 is attached to an eye 44. Eye 44 is connected to a bracket 46 secured to the top of side member 26. Eyes 37 and 44 include threaded bolts that are used to adjust the tension of cables 33 and 34. As shown in FIG. 4, cable 33 extends over plate 41 and is connected thereto with a U-bolt 42. Cable 34 extends over the opposite end of plate 41 and secured thereto with a U-bolt 47.

As shown in FIG. 2, collector 18 has a forward auger 48 and a trailing auger 49 that are driven in opposite directions as indicated by the arrows. Augers 48 and 49 are operatively connected to gear box 29 and extend to suitable bearing supports 50A and 50B located below end plate 27. Auger 48 is smaller in diameter than auger 49. A plurality of straight knives 48A are secured to the outer edge of the helical flight of auger 48 to assist in cutting of the material 16. A plurality of hooked or curved knives 49A are secured to the outer edge of the helical flight of auger 49. The knives 49A are curved toward impeller assembly 19 causing the rear auger 49 to be more aggressive than the forward auger 48. This increases the resistance to forward movement of collector 18 thereby reducing surging or pausing of collector 18. The operation of the collector 18 is smooth and efficient in collecting and moving material 16 to the impeller assembly 19.

As shown in FIG. 6, the pair of wall cleaners 52 and 53 are secured to the outer ends of the augers 48 and 49. Horizontally disposed wall wheels 54 and 56 rotatably mounted on top of end plate 27 are adapted to engage the inside surface of silo wall 12. A generally horizontal guard rail 57 secured to frame member 24 extends in front of the forward auger 48. A cover or open shield 58 positioned over augers 48 and 49 is secured to frame members 24 and 26. Shield 58 is removed from the silo unloader shown in FIG. 2 to facilitate the illustration of augers 48 and 49. In use, shield 58 is located over augers 48 and 49. Augers 48 and 49 are rotated in opposite direction to move the material in generally radially inward direction as indicated by the arrows 51 toward impeller housing 32. The lower portion of the impeller housing has front and side openings to receive the material from augers 48 and 49. An example of the structure of the impeller housing and the impeller is shown in U.S. Pat. No. 3,221,904.

A downwardly directed rear shield 59 is secured to the frame member 26 immediately behind rear auger 49. A stop indicated generally at 61 is mounted on frame member 26 adjacent the outer end thereof. Stop 61 is inoperative during the normal movement of collector 18 around the silo. Stop 61 retards reverse movement of collector 18. In use, stop 61 upon reverse movement of collector 18 raises the augers 48 and 49 from the surface of the material in the silo thereby reducing the reverse force of auger 49 on collector 18. This limits backward or reverse movement of collector 18 in the event that the drive to move collector around the silo is interrupted. Stop 61 has a pair of downwardly directed legs 62 and 63. A generally angular shaped foot 64 is secured to the lower end of legs 62 and 63. The upper ends of legs 62 and 63 are pivotally mounted on a pair of ears 66 and 67 with a pivot bolt 68. Ears 66 and 67 are secured by means of welds or the like to frame member 26. As shown in FIG. 7, when collector 18 moves in its forward or normal direction around the silo, stop 61 is inoperative and merely drags on the surface of the material in the silo. When the drive for the collector, hereinafter described, is interrupted, rear auger 49 being driven in the direction of arrow 69 establishes a rearward force indicated by arrow 71 on collector 18. This drives collector 18 in a rearward direction. Foot 64 will dig in to the surface of material 16 causing the outer end of collector 18 to raise as shown in broken lines in FIG. 8. This lifts auger 49 out of engagement with material 16 and thereby relieving the rearwardly directed force on collector 18.

Referring to FIGS. 1 and 2, the inner end of frame members 24 and 26 has a first arm 72 and a second arm 78. Arm 72 extends generally normal to frame members 24 and 26 and is secured thereto with fasteners, such as nut and bolt assemblies 73 and 74. A wheel 76 is rotatably mounted on the outer end of arm 72 with an upright axle 77, such as a nut and bolt assembly. Second arm 78 is pivotally connected at its mid-section with a pivot pin 79 to a cross member or bracket 75 secured to the outer ends of frame members 24 and 26. A wheel 81 is rotatably mounted on trailing or rear end of arm 78 with an upright axle 82. The forward end of arm 78 is connected with a connector 86 to a tension spring 83. A chain 84 connects tension spring 83 to motor mount 89. Tension spring 83 functions to bias the arm 78 and wheel 81 in the direction of the arrow 87 to continuously hold wheel 81 in engagement with the inner surface of the silo wall 12. Wall wheels 54 and 56 and guide wheels 76 and 81 being in continuous engagement with the silo wall stabilize and maintain the efficient high volume operating position of silo unloader 10 as it is driven around the inside of the silo. The spring loaded pressure wheel 81 keeps the silo unloader under tension within the silo. This reduces unloader bounce in frozen or very compact material and maintains wall cleaners 52 and 53 close to the silo wall whereby the wall cleaners effectively remove substantailly all of the material from the inside of the silo wall.

Referring to FIG. 9, an electric motor 88 is mounted on frame members 24 and 26 rearwardly of impeller assembly 19 with a mount 89. Mount 89 is slidably positioned on frame members 24 and 25 to permit tensioning of the drive belts for the impeller and gear box 29. Mount 89 has a first member 89A and a second member 89B. First member 89A has generally inverted U-shape which is positioned transversely over frame members 24 and 26. As shown in FIG. 10, second member 89B has a generally inverted U-shape which is positioned transversely over frame members 24 and 26 behind member 89A. The base of electric motor 88 is secured with nut and bolt assemblies 90 to members 89A and 89B. The ends of member 89B extend downwardly adjacent the outside portions of frame members 24 and 26. Each end has an elongated horizontal slot 136 accommodating a rod 137 positioned below frame members 24 and 26. Rod 137 has normally disposed ends 137A and 137B which hold rod 137 in assembled relation with member 89B. Ends 137A and 137B have a length slightly shorter than the length of slots 136. As shown in FIG. 11, rod 137 can be rotated 90° to align ends 137A and 137B with slots 136 so that rod 137 can be removed from members 89B. This facilitates the time and labor involved in mounting electric motor 88 on frame members 24 and 26. Rod 137 is manually movable so that the electric motor 88 can be mounted on and removed from the silo unloader without the use of the tool. As shown in FIGS. 2 and 9, adjusting bolts 138 engage transverse member 95 secured to frame members 24 and 26 and upright ears 139 and 141 secured to the top of member 89A. Nuts threaded onto bolts 138 hold motor 88 in an adjusted longitudinal position on frame members 24 and 26 to maintain tension on the drive belts connected to motor 88. As shown in FIGS. 2 and 9, motor 88 has a pair of drive pulleys 91 and 94. Pulley 91 is aligned with a pulley 92 connected to the input of gear box 29. An endless belt 93 drivably connects pulleys 91 and 92. Pulley 94 is aligned with an impeller pulley 96 mounted on the impeller shaft 40. An endless belt 97 drivably connects pulleys 94 and 96. Gear box 29 has an output shaft carrying a sprocket 98. An endless chain 102 connects sprocket 98 with a driven sprocket 99 mounted on the input shaft of a worm gear transmission 101. Sprocket 99 is part of a friction disk clutch that limits the torque delivered to shaft 101. A nut on the clutch is used to adjust the amount of torque that is transmitted by the clutch to shaft 101. Transmission 101 is mounted on a bracket 103 secured to frame member 26. Transmission 101 has an upright output shaft 104.

As shown in FIG. 3, arms 106, 107, and 108 are located in a triangular arrangement and connected to each other with nut and bolt assemblies 109, 111, and 112. The arms 106–108 are mounted on a circular ring 113 with a plurality of nut and bolt assemblies 114 and 115. The transition assembly indicated generally at 117 is mounted on top of ring 113. The entrance to the discharge chute 21 is pivotally connected to the top spout 116 transition assembly 117. The ends of arm 106–108 are connected to cables 20. The upper ends of cables 20 are attached to the lower end of pendent cable 17 as shown in FIG. 1. The drive for collector 18 comprising chain 124 and sprocket 119 is located below and within the physical size of ring 113. Plate 41 does not extend beyond arms 106, 107, and 108. The entire drive for collector 18 does not physically increase the size of the silo unloader. This allows silo unloader 10 to be elevated into the top area of a conventional tripod used to support a silo unloader in a tower silo. The filling of the top of the silo is facilitated when the silo unloader is located in the top area of the tripod.

Figure 13:
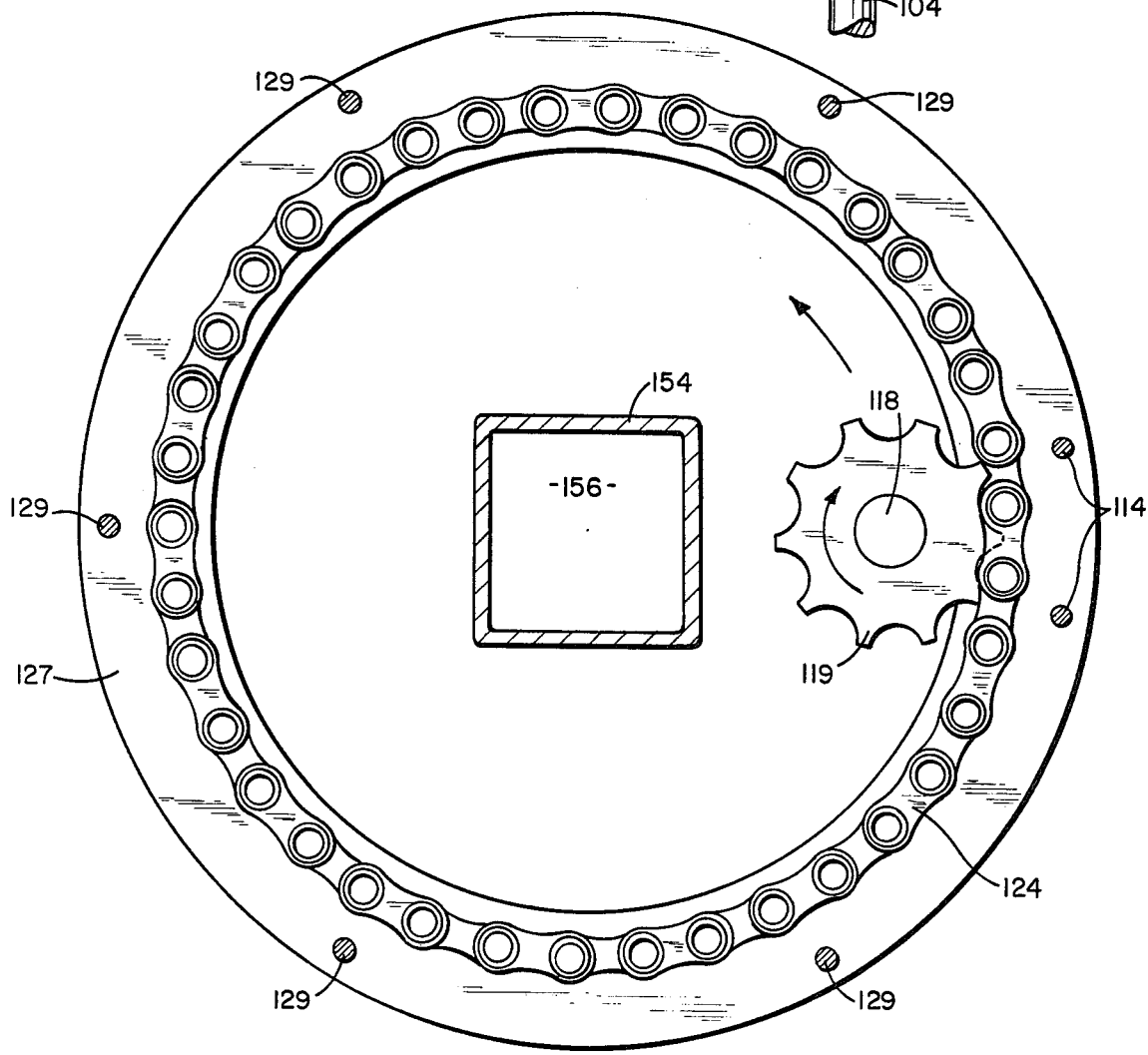
FIG. 13 is a sectional view taken along the line 13—13 of FIG. 12.

Referring to FIGS. 12 and 13, shaft 104 is connected with a sprocket shaft 118 with a coupling 121. Coupling 121 has a first member 142 splined to shaft 104 and a second member 143 secured to shaft 118 with a shear pin 144. A plurality of nut and bolt assemblies 146 connect members 142 and 143 to each other. A sprocket 119 is mounted on the upper end of shaft 118. Shaft 118 is rotatably mounted on plate 41 with a bearing 122. A plurality of nut and bolt assemblies 123 secure bearing 122 to plate 41. Sprocket 119 engages an endless roller link chain 124 located below ring 113. The lower side of ring 113 has an annular groove 126 accommodating the upper links of chain 124. A second ring 127 having an annular groove 128 accommodates the lower links of chain 124. A plurality of nut and bolt assembly 129 clamp chain 124 between rings 113 and 127. A plurality of pins 131 extend through holes 132 in ring 113. A link 133 is attached to the upper ends of pins 131. Pins 131 prevent the chain 124 from slipping or rotating relative to rings 113 and 127.

Transition assembly 117 has a housing 147 mounted on plate 113. Spout 116 having passage 148 is joined to the center of housing 147. A circular plate 149 is located within housing 147. The outer edge of plate 149 has a rim 151 bearing on the top of ring 113. A first circular sleeve 152 of hard plastic is located between the outer edge of rim 151 and the adjacent portion of housing 147. A second circular sleeve 153 of hard plastic is located between the inner circular edge of plate 149 and the lower end of chute 116. Sleeves 152 and 153 are circular wear strips that serve as bearing members for lateral forces on housing 147 due to high pressures caused by sprocket 119 engaging chain 124. Plate 149 is joined to a central throat member 154 having a pasasge 156 aligned with passage 148 of spout 116. The lower end of throat member 154 is attached to the material discharge end 32 A of impeller assembly housing 32. An example of these connections is disclosed in U.S. Pat. No. 3,181,715.

In use, silo unloader 10 is pendently supported from support structures, such as a tripod, mounted on the top of the silo wall with cable 17. Torque arm 22 connected to the non-rotatable portion of transition assembly 117 so that chute 21 and assembly 117 does not rotate around the silo wall 12. This maintains the discharge chute 21 in alignment with an open doorway 13 of silo wall 12. Torque arm 22 also prevents rings 113 and 117 along with chain 124 secured thereto from rotating. Chain 124 is a fixed circular drive track that is drivably associated with sprocket 119. Motor 88 simultaneously drives gear box 29 and the impeller located within the impeller assembly 19. Sprocket 98 connected to an output drive shaft of gear box 29 transmits power to worm gear box 101. This rotates the shaft 104 thereby driving sprocket 119. Rotation of sprocket 119 cause sprocket 119 to move around roller link chain 124. This applies torque to plate 41 thereby moving collector 18 about generally upright axis centrally located in the silo. Cables 33 and 34 being connected to opposite end portions of plate 41 transmit torque to frame members 24 and 26 thereby reduce the twisting and turning force on impeller assembly 19.

Augers 48 and 49 are rotated in opposite directions by gear box 29, collect and move the material in a generally radial direction into impeller housing 32. Forward auger 48 is smaller in diameter than rear auger 49 and rotates faster than rear auger 49. The straight knives 48A on auger 48 assist in cutting of the top material in the silo. The forward auger 48 pulls collector 18 around the silo as it rotates in a clockwise direction. The rear auger 29 retards forward movement of collector 18 as it rotates in a counter clockwise direction. The hooked knives 49A on auger 49 ensure that auger 49 is more aggressive than forward auger 48. This results in smooth and continuous forward movement of collector 18. The surging and pausing of collector 18 is minimized. The rotating impeller picks up the material and discharges it into discharge chute 21. Chute 21 directs the material through open doorway 13.

In the event that the drive for moving collector 18 is interrupted during operation of silo unloader 10, augers 48 and 49 continue to rotate and move material to impeller assembly 19. Trailing auger 49 being driven in a counter-clockwise or reverse direction causes collector 18 to move in a backward direction. This reverse movement of collector 18 is limited by stop 61. Foot 64 digs into the material as legs 62 and 63 lift the outer sections of augers 48 and 49 out of driving engagement with the material. Stop 61 and the lifting of augers 48 and 49 prevents further backward movement of collector 18.

The invention has been described with respect to a preferred embodiment thereof. It is to be understood that it is not to be so limited as changes can be made therein without departing from the invention. The invention is defined in the following claims.

We claim:

1. A top unloading silo unloader pendently supported in a silo having a cylindrical side wall for collecting material stored in the silo and discharging material through an open doorway in said side wall comprising:

an elongated frame having an outer end located adjacent the side wall and an inner end, auger means located generally parallel to said frame operable to move material stored in the silo toward the center area of the silo, means rotatably mounting the auger means on the frame, an impeller assembly mounted on the frame adjacent the auger means for receiving material from the auger means and discharging the material through said open doorway, said impeller assembly having a housing with a first opening to receive material from the auger means, a second opening for discharging material from said housing, and impeller means located within the housing for moving material through said second opening, a transition assembly located adjacent the top of said housing of the impeller assembly, said transition assembly having a rotatable portion secured to said housing of the impeller assembly and a non-rotatable portion, torque arm means connected to said non-rotatable portion preventing rotation thereof in said silo, a laterally projected plate secured to the housing of the impeller assembly below said transition assembly, cable means secured to said plate and opposite ends of the elongated frame to reinforce the rigidity of the frame and reduce torque on the housing, drive means for rotating the auger means and moving the frame and auger means around the silo in a forward direction, said drive means comprising a motor mounted on said frame, first power transmitting means connecting the motor to the auger means for rotating said auger means, second power transmitting means connecting the motor to the impeller means for rotating said impeller means, and third power transmitting means for moving said frame and auger means around said silo wall, said third power means including a power transmission mounted on the frame, said power transmission having a driven shaft rotatably mounted on said plate, a sprocket mounted on said shaft, generally circular endless chain means located in driving engagement with said sprocket, and means securing said chain means to said non-rotatable portion of the transition assembly to prevent relative motion therebetween, first wheel means mounted on the outer end of said frame engageable with said side wall of the silo, and second wheel means including at least one arm pivotally mounted on said frame, a wheel rotatably mounted on said arm, and means for biasing said arm in a direction to hold the wheel in engagement with the side wall of the silo.

2. The silo unloader of claim 1 wherein: the frame includes laterally spaced frame members extended generally parallel to each other, and means securing the cable means to opposite ends of the frame members.

3. The silo unloader of claim 1 wherein: the frame comprises a first elongated frame member and a second elongated frame member generally parallel to said first frame member, said frame members being located adjacent opposite sides of said housing, said plate having a first end on one side of the housing located above the first member and a second end on the other side of the housing located above the second frame member, said cable means comprises a first cable and a second cable, each of said cables having opposite ends, means securing the first cable to the second end of said plate, means securing the ends of the first cable to opposite ends of the first frame member, means securing the second cable to the first end of said plate, and means securing the ends of the second cable to opposite ends of the second frame member.

4. The silo unloader of claim 1 wherein: said means securing the chain means to the non-rotatable portion of the transition assembly includes a first annular member on said transition assembly and a second annular member, said chain means being located between said first and second annular members, and means mounting the second annular member on the first annular member and clamping said chain means between said first and second members.

5. The silo unloader of claim 4 wherein: each of said first and second annular members have an annular groove to accommodate portions of the chain means.

6. The silo unloader of claim 4 including: means securing the chain means to at least one of said annular members.

7. The silo unloader of claim 4 wherein: said chain means is a roller link chain.

8. The silo unloader of claim 1 wherein: said auger means includes a rotatable auger that is rotated in a direction to move the frame and auger means in a reverse direction, and stop means connected to said frame and engageable with material within the silo for limiting movement of the frame and auger means in said reverse direction in said silo.

9. The silo unloader of claim 8 wherein: said stop means includes arm means and pivot means connecting the arm means to an outer end section of the frame.

10. The silo unloader of claim 9 including: a foot secured to the lower end of the arm means engagable with the material in the silo.

11. The silo unloader of claim 1 including: third wheel means having an arm member secured to the frame and extended laterally therefrom, said arm member having an outer end, a wheel rotatably mounted for rotation about an upright axis on the outer end of said arm member adapted to engage the side wall of the silo, and said at least one arm having an outer end extended in a direction generally opposite the arm member.

12. A top unloading silo unloader pendently supported in a silo having a side wall with an opening for removing material from said silo comprising: collector means for gathering material and moving said material to the central area of said silo, drive means for moving said collector means in one direction around the inside of said silo, said collector means having at least one rotatable auger that is rotated in a direction to move the collector means in a direction opposite said one direction, stop means secured to the collector means engageable with the material in the silo to limit movement of the collector means in said direction opposite said one direction, and material transfer means for receiving material from the collector means and discharging the material to the opening in the side wall of the silo.

13. The silo unloader of claim 12 wherein: said stop means includes arm means and pivot means connecting the arm means to an outer end section of the collector means.

14. The silo unloader of claim 13 including: a foot secured to the lower end of the arm means engageable with the material in the silo.

15. The silo unloader of claim 12 wherein: said collector means includes means rotating said auger in a direction to move the collector means in a direction opposite said one direction, said stop means includes arm means, and pivot means connecting the arm means to an outer end section of the collector means, said arm means engageable with said material upon movement thereof in said direction opposite said one direction to lift the auger from the material thereby reducing the drive of said auger to move the collector means in said silo.

16. The silo unloader of claim 15 including: foot means secured to the lower end of the arm means engageable with the material in the silo.

17. The silo unloader of claim 12 including: knife means secured to said one rotatable auger for cutting material in the silo upon rotation of said auger.

18. A top unloading silo unloader pendently supported in a silo having a side wall with opening for removing material from said silo comprising: a frame, collector means attached to the frame for gathering material and moving said material to the central area of said silo, drive means for moving said collector means in one direction around the inside of said silo, material transfer means mounted on the frame for receiving material from the collector means and discharging the material to the opening in the side wall of the silo, non-rotatable annular means adapted to be anchored to the silo wall, said drive means including an endless chain, means securing the chain to the annular means to prevent relative motion therebetween, a power transmission means mounted on the frame, said power transmission means having a driven shaft, a sprocket secured to the shaft engagable with said chain, and means for supplying power to said power transmission means whereby said sprocket moves around said chain to move the collector means around the silo.

19. The silo unloader of claim 18 wherein: said means securing the chain to the non-rotatable annular means includes an annular member, said chain being located between said annular member and annular means, and means mounting the annular member on the annular means and clamping said chain between said annular member and annular means.

20. The silo unloader of claim 19 wherein: each of said annular means and annular member has an annular groove to accommodate portions of the chain.

21. The silo unloader of claim 20 including: means anchoring the chain to at least one of said annular means or annular member.

22. The silo unloader of claim 19 wherein: said chain is a roller link chain.

23. The silo unloader of claim 18 wherein said frame has an inner end and an outer end, and first wheel means mounted on the outer end of said frame engageable with said side wall of the silo, said second wheel means engageable with said side wall of the silo, said second wheel means including at least one first arm pivotally mounted on an inner portion of said frame, a wheel rotatably mounted on said first arm, and means biasing said first arm in a direction to hold the wheel in engagement with the side wall of the silo, and third wheel means having a second arm secured to the inner end of the frame and extended laterally therefrom, said second arm having an outer end, a wheel rotatably mounted for rotation about an upright axis on the outer end of the second arm adapted to engage the side wall of the silo, said third arm extended in a direction generally opposite the second arm.

24. The silo unloader of claim 23 wherein: said inner end of the frame has a leading side and a trailing side, said first arm extended generally laterally from the trailing side of said frame, said second arm extended generally laterally from the leading side of said frame.

25. A silo unloader pendently supported in a silo having a side wall with an opening therein for removing material from said silo comprising:
an elongated frame, means mounted on the frame operable to move material stored in the silo toward the center area of the silo,
material transfer means mounted on the frame for receiving and discharging material toward an opening in the side wall,
a transition assembly located adjacent said material transfer means, said transition assembly having a rotatable portion secured to the material transfer means and a non-rotatable portion,
means connected to the non-rotatable portion preventing rotation thereof in said silo, and
drive means located adjacent said transition assembly operable to move the frame around the inside of said silo in a forward direction whereby said means mounted on the frame operable to move material stored in the silo continuously moves material to the material transfer means,
said drive means having first endless means secured to said non-rotatable portion of the transition assembly to prevent relative rotation therebetween, second means fixed with respect to said frame engageable with said first means, and power means for driving said second means whereby said second means moves around said first means and said frame moves around said inside of the silo in said forward direction.

26. The silo unloader of claim 25 wherein: said first means is an endless chain, means securing the chain to the non-rotatable portion of the transition assembly, said second means includes a sprocket located in driving engagement with said chain, said power means includes a power transmission having a driven shaft, said sprocket being mounted on said shaft, and means for supplying power to said power transmission.

27. The silo unloader of claim 25 wherein: said means securing the chain to the non-rotatable portion includes an an annular member, said chain being located between said annular member and non-rotatable portion, and means mounting the annular member on the non-rotatable portion and clamping said chain means between said annular member and non-rotatable portion.

28. The silo unloader of claim 27 wherein: each of said annular member and non-rotatable portion has an annular groove to accommodate portions of the chain.

29. The silo unloader of claim 27 including: means anchoring the chain to at least one of said annular member or non-rotatable portion.

30. The silo unloader of claim 27 wherein: said chain is a roller link chain.

31. The silo unloader of claim 25 including: lateral means located below said transition assembly secured to the material transfer means and movable therewith, said second means being rotatably mounted on said lateral means.

32. The silo unloader of claim 31 including: cable means secured to said lateral means and opposite ends of the elongated frame to reinforce the rigidity of the frame and reduce torque on the material transfer means.

33. The silo unloader of claim 32 wherein: the frame includes laterally spaced frame members extended generally parallel to each other, and means securing the cable means to opposite ends of the frame members.

34. The silo unloader of claim 32 wherein: the frame comprises a first elongated frame member and a second elongated frame member generally parallel to said first frame member, said frame members being located adjacent opposite sides of said material transfer means including a housing, said lateral means having a first end on one side of the housing located above the first member and a second end on the other side of the housing located above the second frame member, said cable means comprises a first cable and a second cable, each of said cables having opposite ends, means securing the first cable to the second end of said lateral means, means securing the ends of the first cable to opposite ends of the first frame member, means securing the second cable to the first end of said lateral means, and means securing the ends of the second cable to opposite ends of the second frame member.

35. The silo unloader of claim 25 including: first wheel means mounted on the outer end of said frame engageable with said side wall of the silo, and second wheel means engageable with said side wall of the silo, said second wheel means including at least one arm pivotally mounted on an inner portion of said frame, a wheel rotatably mounted on said arm, and means biasing said arm in a direction to hold the wheel in engagement with the side wall of the silo.

36. The silo unloader of claim 35 including: third wheel means having an arm member secured to the frame and extended laterally therefrom, said arm member having an outer end, a wheel rotatably mounted for rotation about an upright axis on the outer end of said arm member, said first wheel being located to engage the side wall of the silo, and said at least one arm having an outer end extended in a direcion generally opposite the arm member.

37. The silo unloader of claim 25 wherein: the means mounted on the frame operable to move material stored in the silo includes at least one rotatable auger that is rotated in a direction to move the frame in a reverse direction around the inside of said silo, and stop means mounted on the outer end section of the frame operable to limit movement of the frame in the silo in said reverse direction.

38. The silo unloader of claim 37 wherein: said stop means includes arm means and pivot means connecting the arm means to an outer end section of the frame.

39. The silo unloader of claim 38 including: a foot secured to the lower end of the arm means engageable with the material in the silo.

40. The silo unloader of claim 37 wherein: said means mounted on the frame operable to move material includes means rotating the auger in a reverse direction, said stop means includes arm means, and pivot means connecting the arm means to an outer end section of the frame, said arm means engageable with said material upon movement of the frame in a reverse direction to life the auger from the material thereby reducing the drive of said auger to move the frame in said silo.

41. The silo unloader of claim 40 including: foot means secured to the lower end of the arm means engageable with the material in the silo.

42. The silo unloader of claim 37 including: knife means mounted on said one rotatable auger for cutting the material in the silo upon rotation of said auger.

43. The silo unloader of claim 25 wherein: the means mounted on the frame operable to move material stored in the silo includes a front auger and a rear auger located behind the front auger, knife means mounted on the rear auger for cutting the material in the silo upon rotation of said rear auger, and means for rotating the front auger in a forward direction to assist movement of the frame around the inside of the silo in the forward direction and rotating the rear auger in a reverse direction to retard movement of the frame in the forward direction.

44. The silo unloader of claim 43 including: stop means mounted on the outer end section of the frame operable to limit movement of the frame in the silo in said reverse direction.

45. The silo unloader of claim 44 wherein: said stop means includes arm means and pivot means connecting the arm means to said outer end section of the frame.

46. The silo unloader of claim 45 including: foot means secured to the lower end of the arm means engageable with the material in the silo.

47. A top unloading silo unloader locatable in a silo having a side wall with at least one opening for removing material from said silo comprising: collector means for gathering material and moving material to the central area of said silo, said collector means having a front auger and a rear auger located behind the front auger, knife means secured to the rear auger for cutting the material in the silo upon rotation of said rear auger, means for rotating the front auger in a forward direction to assist movement of the collector means around the inside of the silo in the forward direction and rotating the rear auger in a reverse direction to retard movement of the collector means in the forward direction, said reverse direction being opposite said forward direction, stop means secured to the collector means engageable with the material in the silo to limit movement of the collector means in said reverse direction, and material transfer means for receiving material from the collector means and discharging the material to the opening in the side wall of the silo.

48. The silo unloader of claim 47 wherein: said stop means includes arm means, and pivot means connecting the arm means to an outer end section of the collector means, said arm means engageable with the material in the silo upon movement of the collector means in the reverse direction to lift the front and rear augers from the material thereby reducing the drive of said augers to move the collector means in said silo.

49. The silo unloader of claim 48 including: foot means secured to the lower end of the arm means engageable with the material in the silo.

* * * * *